United States Patent
Wu

(10) Patent No.: US 8,046,925 B2
(45) Date of Patent: Nov. 1, 2011

(54) PRUNING HOOK HAVING AN ENERGY-SAVING FUNCTION

(75) Inventor: Shih-Piao Wu, Changhua Hsien (TW)

(73) Assignee: Jiin Haur Industrial Co., Ltd., Changhua Hsien (TW)

( * ) Notice: Subject to any disclaimer, the term of this patent is extended or adjusted under 35 U.S.C. 154(b) by 252 days.

(21) Appl. No.: 12/471,617

(22) Filed: May 26, 2009

(65) Prior Publication Data

US 2010/0299939 A1    Dec. 2, 2010

(51) Int. Cl.
 *B26B 13/26* (2006.01)
(52) U.S. Cl. ............................................. 30/249; 30/245
(58) Field of Classification Search ................... 30/245, 30/246, 249, 296.1
See application file for complete search history.

(56) References Cited

U.S. PATENT DOCUMENTS

| | | | | |
|---|---|---|---|---|
| 2,593,323 A * | 4/1952 | Magnussen et al. | ............ | 30/512 |
| 2,744,322 A * | 5/1956 | Gustafson | ........................ | 30/249 |
| 3,715,805 A * | 2/1973 | Fraser | ........................ | 30/166.3 |
| 5,933,965 A * | 8/1999 | Linden et al. | ................... | 30/249 |
| 5,950,315 A * | 9/1999 | Linden | ........................ | 30/249 |
| 6,178,644 B1 * | 1/2001 | Le et al. | ........................ | 30/249 |
| 6,345,445 B1 * | 2/2002 | Schofield | ........................ | 30/249 |
| 7,658,011 B2 * | 2/2010 | Shan | ........................ | 30/249 |
| 2010/0192385 A1 * | 8/2010 | Pittau | ........................ | 30/249 |
| 2010/0299938 A1 * | 12/2010 | Wu | ........................ | 30/249 |
| 2010/0299939 A1 * | 12/2010 | Wu | ........................ | 30/249 |
| 2011/0016730 A1 * | 1/2011 | Wu | ........................ | 30/249 |
| 2011/0107606 A1 * | 5/2011 | Shan | ........................ | 30/249 |
| 2011/0113635 A1 * | 5/2011 | Lee et al. | ........................ | 30/194 |

* cited by examiner

*Primary Examiner* — Hwei C Payer
(74) *Attorney, Agent, or Firm* — Alan Kamrath; Kamrath & Associates PA

(57) ABSTRACT

A pruning hook includes an extension shank, a blade unit including a fixed blade mounted on the extension shank and a movable blade pivotally connected with the fixed blade, a driving cord to drive the movable blade, a slide movably mounted in the extension shank to drive the driving cord, a pull cord mounted in the extension shank to drive the slide, and a pulling member movable relative to the extension shank to drive the pull cord. Thus, the pulling member is pulled by a user's arm to drive the blade unit so that the blade unit is driven by a greater force applied by the user's arm and has a larger shearing force to perform a cutting action in an easier manner so as to cut a larger object easily and conveniently.

14 Claims, 6 Drawing Sheets

PRUNING HOOK HAVING AN ENERGY-SAVING FUNCTION

BACKGROUND OF THE INVENTION

1. Field of the Invention

The present invention relates to a shearing tool and, more particularly, to a pruning hook for a gardening purpose to shear branches or leaves at a higher location.

2. Description of the Related Art

A conventional pruning hook in accordance with the prior art shown in FIG. 6 comprises an extension shank 60, a blade unit 70 mounted on a front end of the extension shank 60, a driving unit 80 mounted on a rear end of the extension shank 60, an elastic member 81 mounted on the driving unit 80, and a linkage 61 connected between the blade unit 70 and the driving unit 80. In operation, when the driving unit 80 is pressed by a user's hand, the driving unit 80 is operated to drive the linkage 61 which drives the blade unit 70 so as to perform a cutting action. On the contrary, when the pressing force applied on the driving unit 80 is removed, the driving unit 80 is driven by the restoring force of the elastic member 81 to open the blade unit 70 so that the blade unit 70 is opened at a normal state by the elastic force of the elastic member 81.

However, the driving unit 80 is driven by a pressing force applied by the user's hand to drive the blade unit 70 so that the blade unit 70 has a smaller shearing force to perform the cutting action and cannot cut a larger object easily. In addition, the user's hand needs to press the blade unit 70 successively so as to drive the blade unit 70, thereby easily causing pain to the user. Further, the linkage 61 is connected between the blade unit 70 and the driving unit 80 to directly transmit the force from the driving unit 80 to the blade unit 70, so that the blade unit 70 is not operated in an energy-saving manner.

BRIEF SUMMARY OF THE INVENTION

The primary objective of the present invention is to provide a pruning hook having an energy-saving function.

Another objective of the present invention is to provide a pruning hook, wherein the pulling member is pulled by a user's arm to drive the blade unit so that the blade unit is driven by a greater force applied by the user's arm and has a larger shearing force to perform a cutting action in an easier manner so as to cut a larger object easily and conveniently.

A further objective of the present invention is to provide a pruning hook, wherein the pulling member is pulled by the user's arm so that the user needs not to perform the cutting action by a frequent pressing of his hand so as to provide a comfortable sensation to the user.

A further objective of the present invention is to provide a pruning hook, wherein the pull cord co-operates with the pulley, and the driving cord co-operates with the guide pulley so that the blade unit is driven by the pull cord and the driving cord in an energy-saving manner so as to facilitate the user performing the cutting action.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
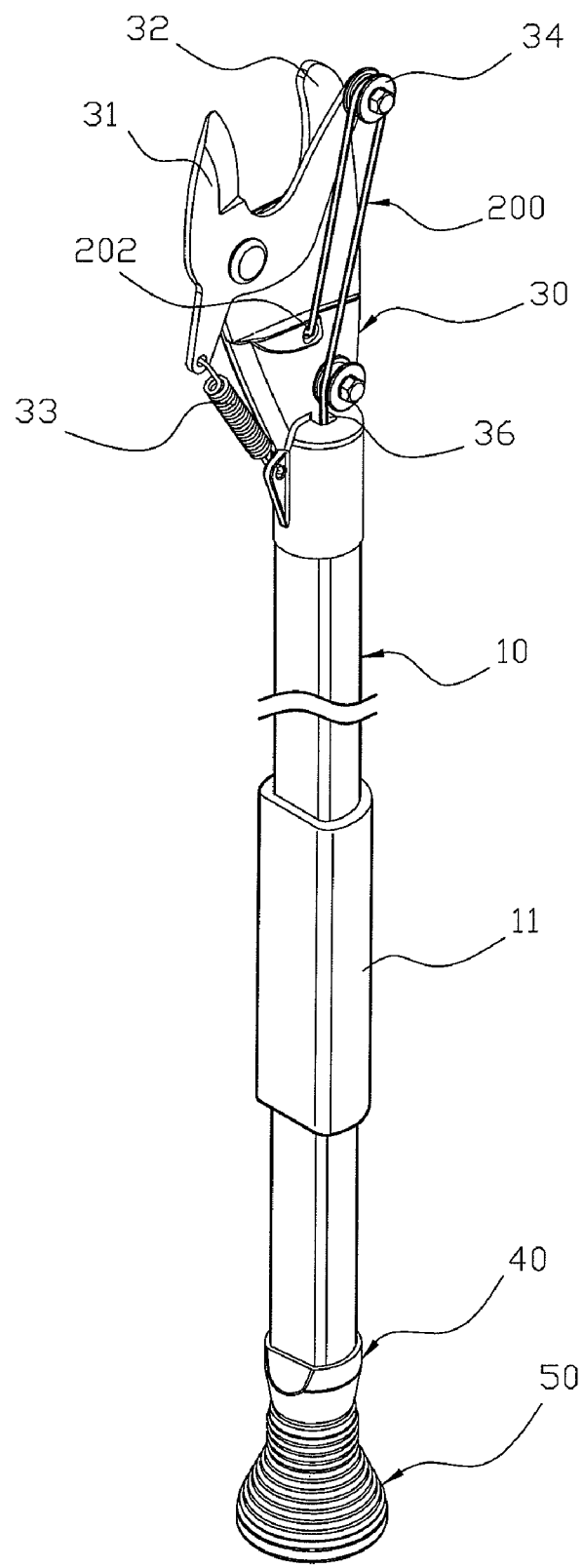
FIG. 1 is a perspective view of a pruning hook in accordance with the preferred embodiment of the present invention.

Referring to the drawings and initially to FIGS. 1-4, a pruning hook in accordance with the preferred embodiment of the present invention comprises an extension shank 10, a blade unit 30 including a fixed blade 32 mounted on the extension shank 10 and a movable blade 31 pivotally connected with and movable relative to the fixed blade 32, a driving cord 200 connected with the movable blade 31 of the blade unit 30 to drive the movable blade 31 of the blade unit 30 to move relative to the fixed blade 32 of the blade unit 30, a slide 20 movably mounted in the extension shank 10 and connected with the driving cord 200 to drive and move the driving cord 200, a pull cord 100 mounted in the extension shank 10 and connected with the slide 20 to drive and move the slide 20, and a pulling member 50 movable relative to the extension shank 10 and connected with the pull cord 100 to drive and move the pull cord 100.

The extension shank 10 is a hollow body and has a substantially semi-circular cross-sectional profile. The extension shank 10 has an inner portion provided with a receiving chamber 12 to receive the driving cord 200, the slide 20 and the pull cord 100. The extension shank 10 has a mediate portion provided with an enlarged holding portion 11 to facilitate a user holding the extension shank 10. The holding portion 11 of the extension shank 10 is spaced from the pulling member 50 and is located between the pulling member 50 and the blade unit 30. The slide 20 is a hollow body. A pulley 21 is rotatably mounted in the slide 20 by a pivot pin 23.

The pull cord 100 is partially received in the slide 20 and is pivotally mounted on the pulley 21 to drive the pulley 21 and the slide 20 to move relative to the extension shank 10. The pull cord 100 is hidden in the receiving chamber 12 of the extension shank 10 and has a first end 102 secured in the pulling member 50 to move in concert with the pulling member 50. The pull cord 100 has a second end 104 secured in a rear end of the extension shank 10.

The pruning hook further comprises a fixing seat 40 secured on the rear end of the extension shank 10, and the second end 104 of the pull cord 100 is secured in the fixing seat 40. The fixing seat 40 is located between the extension shank 10 and the pulling member 50. The fixing seat 40 has a substantially semi-circular cross-sectional profile and has an inner portion provided with a receiving hole 42 to receive the second end 104 of the pull cord 100 and to allow passage of the first end 102 of the pull cord 100. The fixing seat 40 has a first end inserted into the receiving chamber 12 of the extension shank 10 and a second end protruding outwardly from the rear end of the extension shank 10 and provided with a socket 44 connected to the receiving hole 42.

The pulling member 50 is detachably mounted on the fixing seat 40 and has an end portion provided with a reduced plug 54 inserted into and detachably locked in the socket 44 of the fixing seat 40. The pulling member 50 has an inner portion provided with a fixing hole 52 to fix the first end 102 of the pull cord 100 so that the first end 102 of the pull cord 100 is secured on the pulling member 50. The pulling member 50 protrudes outwardly from the fixing seat 40.

The blade unit 30 is mounted on a front end of the extension shank 10. The fixed blade 32 of the blade unit 30 has an inner portion provided with a connecting hole 36 connected to the receiving chamber 12 of the extension shank 10 to allow passage of the driving cord 200. The blade unit 30 further includes a guide pulley 34 rotatably mounted on a first end of the movable blade 31, and an elastic member 33 biased between a second end of the movable blade 31 and the fixed blade 32 to drive the movable blade 31 to move outwardly relative to the fixed blade 32.

The driving cord 200 is pivotally mounted on the guide pulley 34 of the blade unit 30 to drive the movable blade 31 of the blade unit 30 to move toward the fixed blade 32 of the blade unit 30. The driving cord 200 extends through the connecting hole 36 of the fixed blade 32 into the receiving chamber 12 of the extension shank 10. The driving cord 200 has a first end 202 secured on the fixed blade 32 of the blade unit 30 and a second end 204 secured in the slide 20 to move in concert with the slide 20. The second end 204 of the driving cord 200 is secured in the slide 20 by a fixing pin 22. The driving cord 200 co-operates with the pull cord 100 to function as a driving mechanism to drive the blade unit 30.

Figure 2:
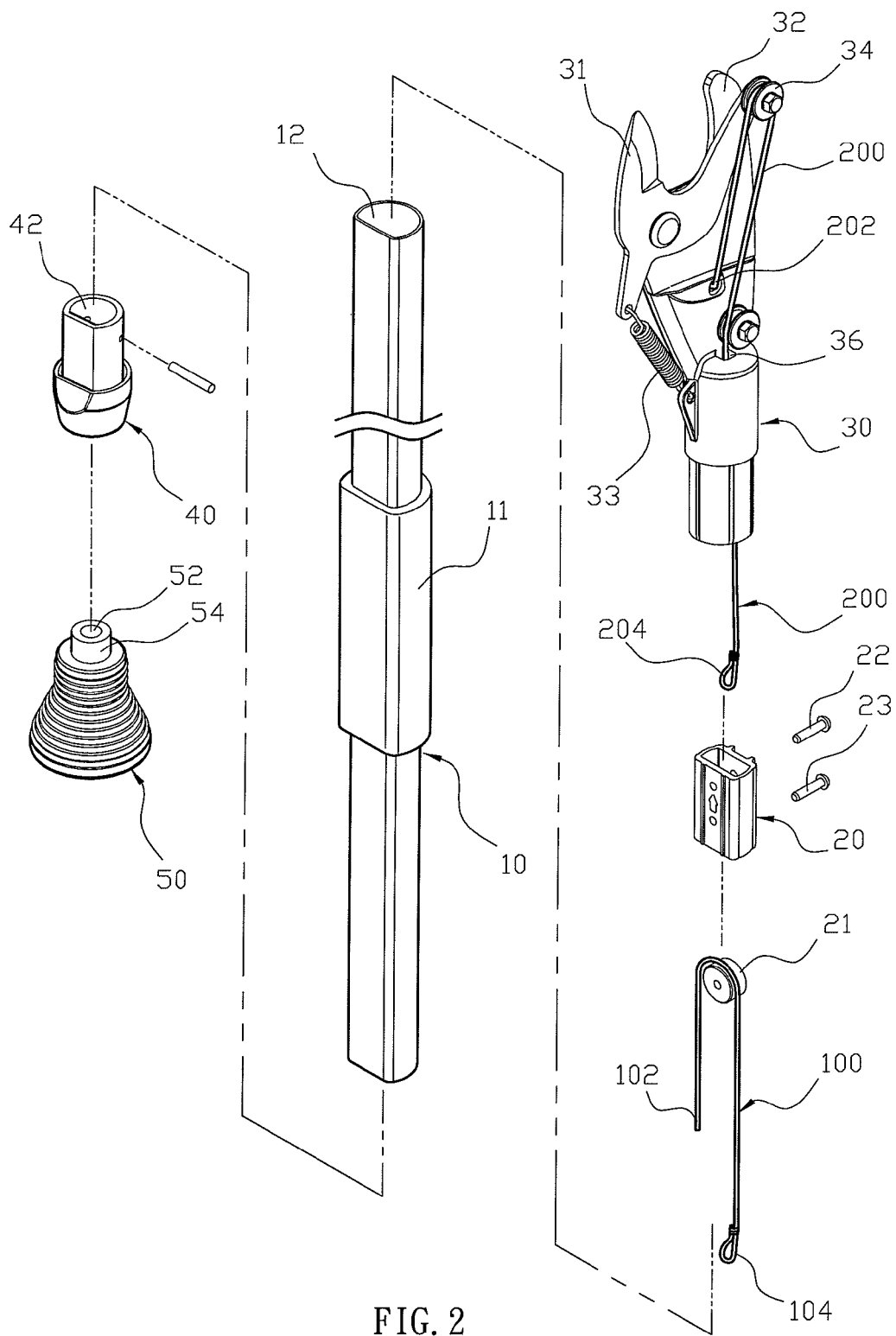
FIG. 2 is an exploded perspective view of the pruning hook as shown in FIG. 1.
Figure 3:
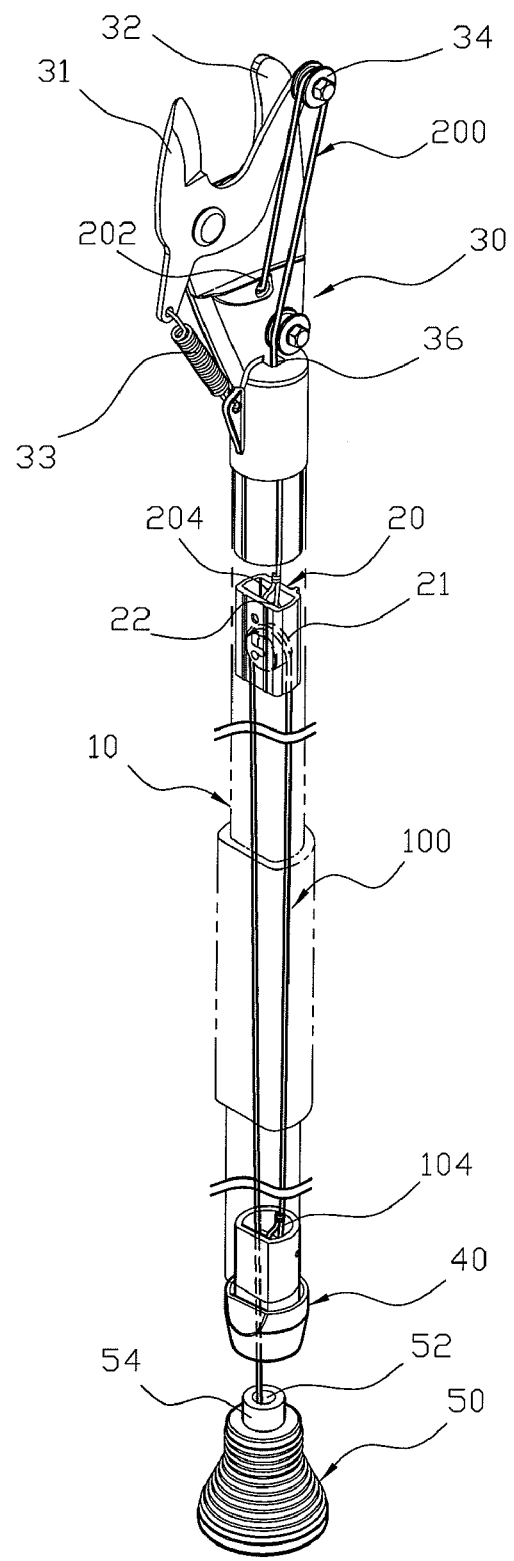
FIG. 3 is a perspective broken view of the pruning hook as shown in FIG. 1.
Figure 4:
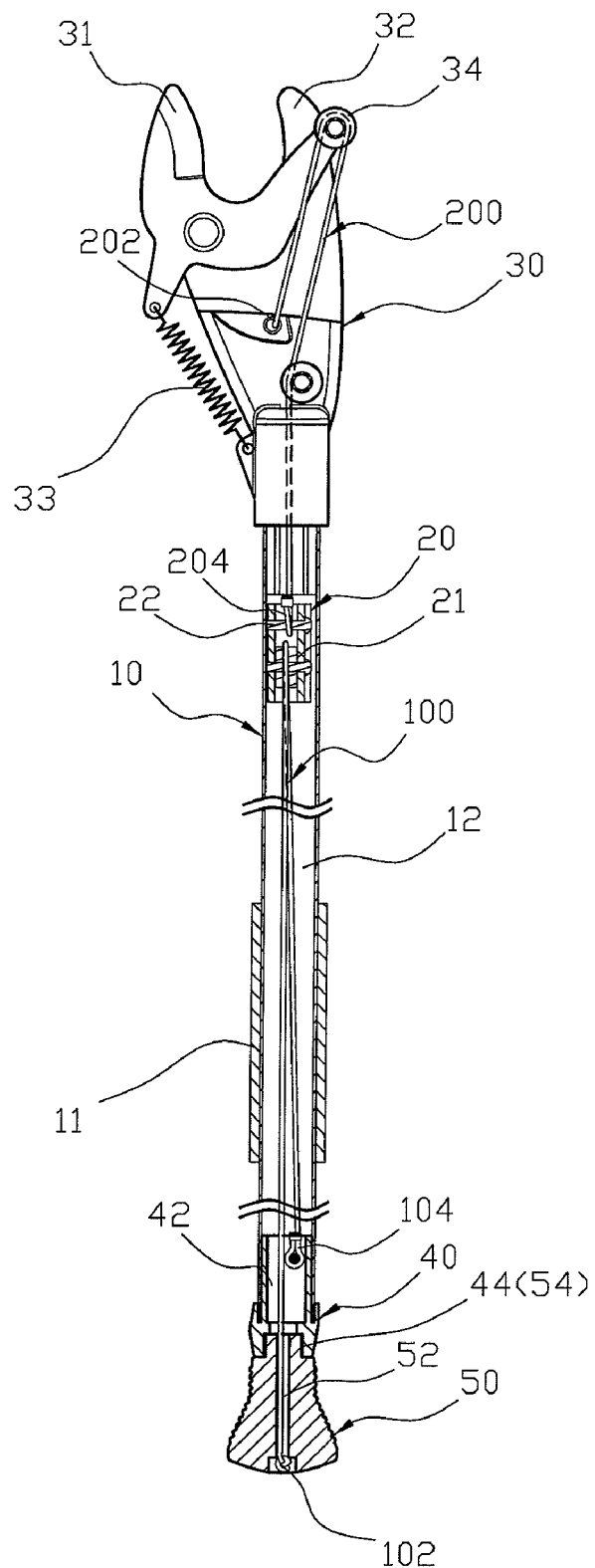
FIG. 4 is a side cross-sectional view of the pruning hook as shown in FIG. 1.
Figure 5:
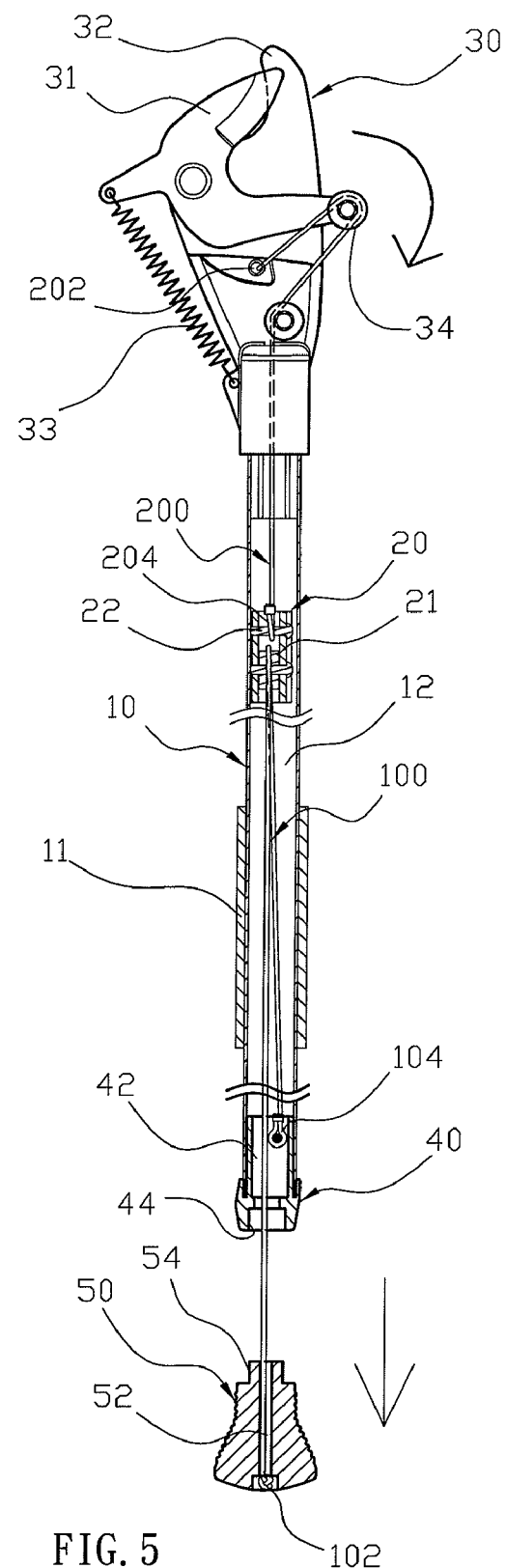
FIG. 5 is a schematic operational view of the pruning hook as shown in FIG. 4 in use.
Figure 6:
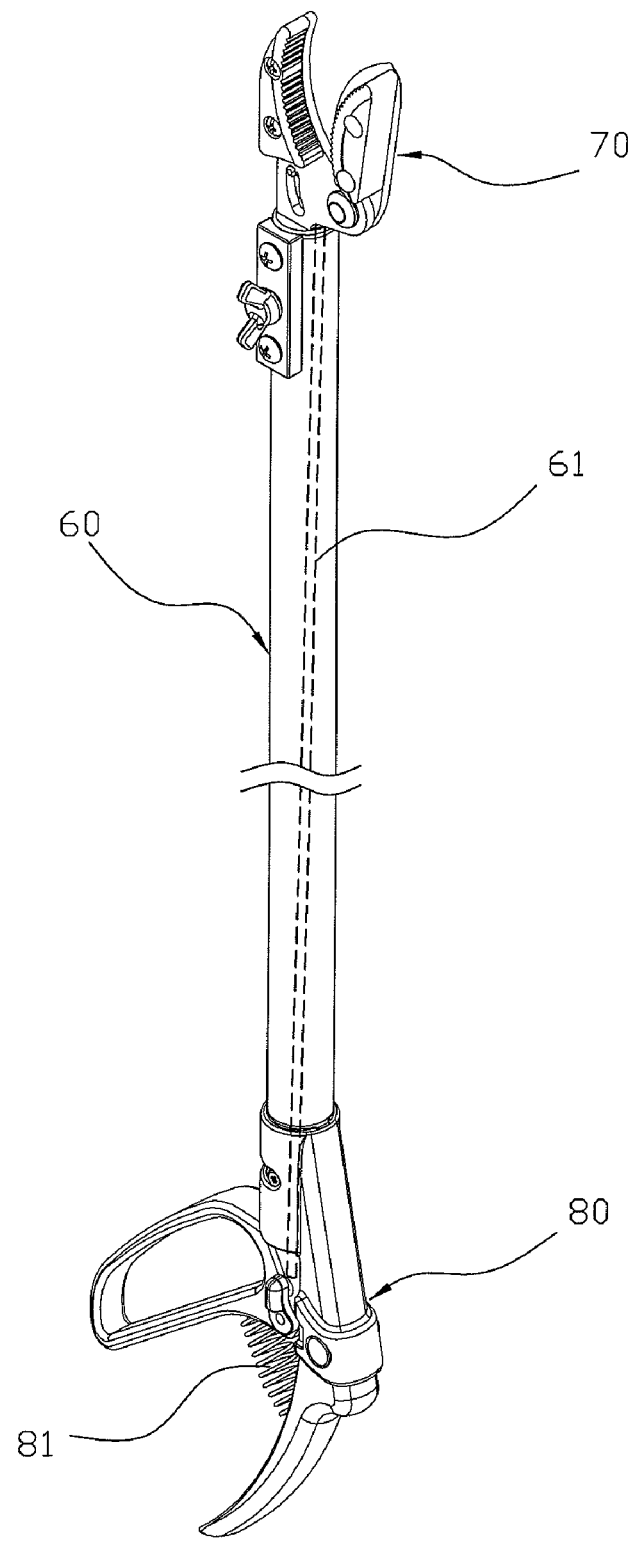
FIG. 6 is a perspective view of a conventional pruning hook in accordance with the prior art.

In operation, referring to FIGS. 4 and 5 with reference to FIGS. 1-3, when the pulling member 50 is pulled by a user to overcome the elastic force of the elastic member 33 and to move outwardly relative to the blade unit 30, the pull cord 100 is driven by the pulling member 50 to move the pulley 21 which moves the slide 20 which moves the driving cord 200 which moves the guide pulley 34 which drives the movable blade 31 of the blade unit 30 to move toward the fixed blade 32 of the blade unit 30 as shown in FIG. 5 so as to perform a cutting action.

On the contrary, when the pulling force applied on the pulling member 50 is removed, the movable blade 31 of the blade unit 30 is driven by the restoring force of the elastic member 33 to move outwardly relative to the fixed blade 32 of the blade unit 30 as shown in FIG. 4 so that the blade unit 30 is opened at a normal state. At this time, the pulling member 50 is moved toward the extension shank 10 to abut the fixing seat 40 which stops and limits a further movement of the pulling member 50.

Accordingly, the pulling member 50 is pulled by a user's arm to drive the blade unit 30 so that the blade unit 30 is driven by a greater force applied by the user's arm and has a larger shearing force to perform a cutting action in an easier manner so as to cut a larger object easily and conveniently. In addition, the pulling member 50 is pulled by the user's arm so that the user needs not to perform the cutting action by a frequent pressing of his hand so as to provide a comfortable sensation to the user. Further, the pull cord 100 co-operates with the pulley 21, and the driving cord 200 co-operates with the guide pulley 34 so that the blade unit 30 is driven by the pull cord 100 and the driving cord 200 in an energy-saving manner so as to facilitate the user performing the cutting action.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pruning hook, comprising:
   an extension shank (10);
   a blade unit (30) including a fixed blade (32) mounted on the extension shank and a movable blade (31) pivotally connected with and movable relative to the fixed blade;
   a driving cord (200) connected with the movable blade of the blade unit to drive the movable blade of the blade unit to move relative to the fixed blade of the blade unit;
   a slide (20) movably mounted in the extension shank and connected with the driving cord to drive and move the driving cord;
   a pull cord (100) mounted in the extension shank and connected with the slide to drive and move the slide;
   a pulling member (50) movable relative to the extension shank and connected with the pull cord to drive and move the pull cord;
   wherein the pull cord has a first end (102) secured in the pulling member to move in concert with the pulling member;
   the pull cord has a second end (104) secured in a rear end of the extension shank;
   the pruning hook further comprises:
   a fixing seat (40) secured on the rear end of the extension shank;
   the second end of the pull cord is secured in the fixing seat;
   the fixing seat has an inner portion provided with a receiving hole (42) to receive the second end of the pull cord and to allow passage of the first end of the pull cord;
   the fixing seat has a first end inserted into the extension shank and a second end protruding outwardly from the rear end of the extension shank.

2. The pruning hook of claim 1, wherein the extension shank has a mediate portion provided with an enlarged holding portion (11) to facilitate a user holding the extension shank.

3. The pruning hook of claim 2, wherein
   the holding portion of the extension shank is spaced from the pulling member;
   the holding portion of the extension shank is located between the pulling member and the blade unit.

4. The pruning hook of claim 1, further comprising:
   a pulley (21) rotatably mounted in the slide;
   the pull cord is pivotally mounted on the pulley to drive the pulley and the slide to move relative to the extension shank.

5. The pruning hook of claim 4, wherein the pulley is rotatably mounted in the slide by a pivot pin (23).

6. The pruning hook of claim 1, wherein
   the blade unit further includes:
   a guide pulley (34) rotatably mounted on a first end of the movable blade;
   an elastic member (33) biased between a second end of the movable blade and the fixed blade to drive the movable blade to move outwardly relative to the fixed blade;
   the driving cord is pivotally mounted on the guide pulley of the blade unit to drive the movable blade of the blade unit to move toward the fixed blade of the blade unit.

7. The pruning hook of claim 6, wherein the driving cord has a first end (202) secured on the fixed blade of the blade unit and a second end (204) secured in the slide to move in concert with the slide.

8. The pruning hook of claim 7, wherein the second end of the driving cord is secured in the slide by a fixing pin.

9. The pruning hook of claim 1, wherein
   the second end of the fixing seat is provided with a socket connected to the receiving hole;
   the pulling member has an end portion provided with a reduced plug inserted into and detachably locked in the socket of the fixing seat.

10. The pruning hook of claim 1, wherein the pulling member has an inner portion provided with a fixing hole to fix the first end of the pull cord so that the first end of the pull cord is secured on the pulling member.

11. The pruning hook of claim 1, wherein the extension shank has an inner portion provided with a receiving chamber to receive the driving cord, the slide and the pull cord;

the blade unit is mounted on a front end of the extension shank;

the fixed blade of the blade unit has an inner portion provided with a connecting hole connected to the receiving chamber of the extension shank to allow passage of the driving cord;

the driving cord extends through the connecting hole of the fixed blade into the receiving chamber of the extension shank.

12. The pruning hook of claim 11, wherein the slide is a hollow body;

the pull cord is partially received in the slide;

the pull cord is hidden in the receiving chamber of the extension shank.

13. The pruning hook of claim 1, wherein the extension shank is a hollow body and has a substantially semi-circular cross-sectional profile;

the fixing seat has a substantially semi-circular cross-sectional profile.

14. A pruning hook, comprising:

an extension shank (10);

a blade unit (30) including a fixed blade (32) mounted on the extension shank and a movable blade (31) pivotally connected with and movable relative to the fixed blade;

a driving cord (200) connected with the movable blade of the blade unit to drive the movable blade of the blade unit to move relative to the fixed blade of the blade unit;

a slide (20) movably mounted in the extension shank and connected with the driving cord to drive and move the driving cord;

a pull cord (100) mounted in the extension shank and connected with the slide to drive and move the slide;

a pulling member (50) movable relative to the extension shank and connected with the pull cord to drive and move the pull cord;

wherein the pull cord has a first end (102) secured in the pulling member to move in concert with the pulling member;

the pull cord has a second end (104) secured in a rear end of the extension shank:

the pruning hook further comprises:

a fixing seat (40) secured on the rear end of the extension shank;

the second end of the pull cord is secured in the fixing seat;

the fixing seat is located between the extension shank and the pulling member;

the pulling member protrudes outwardly from the fixing seat;

the pulling member is detachably mounted on the fixing seat.

* * * * *